(12) United States Patent
Perset

(10) Patent No.: US 6,178,744 B1
(45) Date of Patent: Jan. 30, 2001

(54) CONTROLLED TEMPERATURE CATALYTIC CONVERTER, IN PARTICULAR FOR A MOTOR VEHICLE

(75) Inventor: Denis Perset, Paris (FR)

(73) Assignee: Valeo Thermique Moteur, La Verriere (FR)

(*) Notice: Under 35 U.S.C. 154(b), the term of this patent shall be extended for 0 days.

(21) Appl. No.: 09/219,279

(22) Filed: Dec. 22, 1998

(30) Foreign Application Priority Data

Dec. 24, 1997 (FR) .................................................. 97 16511

(51) Int. Cl.$^7$ ........................................................ F01N 3/00
(52) U.S. Cl. .............................. 60/288; 60/298; 60/320; 60/301
(58) Field of Search .............................. 60/288, 298, 320, 60/301

(56) References Cited

U.S. PATENT DOCUMENTS

| | | | | |
|---|---|---|---|---|
| 3,228,746 | * | 1/1966 | Howk et al. ........................... | 60/276 |
| 3,757,521 | | 9/1973 | Tourtellotte et al. . | |
| 3,842,600 | * | 10/1974 | Nakajima et al. ....................... | 60/276 |
| 4,318,894 | * | 3/1982 | Hensel et al. ........................... | 423/212 |
| 5,184,462 | | 2/1993 | Schatz . | |
| 5,277,026 | * | 1/1994 | Boll et al. ............................... | 60/288 |
| 5,477,676 | * | 12/1995 | Benson et al. .......................... | 60/274 |
| 5,787,706 | * | 8/1998 | Smedler et al. ......................... | 60/288 |
| 5,845,485 | * | 12/1998 | Murphy et al. ......................... | 60/274 |
| 5,983,628 | * | 11/1999 | Borroni-Bird et al. ................. | 60/274 |
| 5,987,885 | * | 11/1999 | Kizer et al. ............................. | 60/298 |
| 6,003,303 | * | 12/1999 | Peter-Hoblyn et al. ............... | 60/274 |

FOREIGN PATENT DOCUMENTS

| | | |
|---|---|---|
| 21 29 210 | 12/1972 | (DE) . |
| 4039688A1 | 6/1991 | (DE) . |
| 19746658A1 | 4/1999 | (DE) . |
| 0879633A2 | 11/1998 | (EP) . |
| 09125972 | * 11/1995 | (JP) . |
| 09184421 | * 12/1995 | (JP) . |
| 96 29141 | 9/1996 | (WO) . |

OTHER PUBLICATIONS

German Patent Office Search Report.

* cited by examiner

Primary Examiner—Thomas Denion
Assistant Examiner—Thai-Ba Trieu
(74) Attorney, Agent, or Firm—Morgan & Finnegan, LLP

(57) ABSTRACT

A catalytic converter includes a casing connected to the output from an exhaust gas and residue manifold of an engine, in particular an engine of a motor vehicle. The casing contains arrangements for oxidizing the exhaust gases and residues and for trapping the oxidized gases and residues. A central part of the casing houses cooling arrangements for reducing the temperature of the gases and residues upstream of the trapping arrangements below a predetermined threshold.

19 Claims, 1 Drawing Sheet

CONTROLLED TEMPERATURE CATALYTIC CONVERTER, IN PARTICULAR FOR A MOTOR VEHICLE

FIELD OF THE INVENTION

The invention concerns the treatment of exhaust gases and residues produced in particular by the engines of motor vehicles.

The invention is more particularly concerned with catalytic converters that comprise a casing an entry end of which is connected to the outlet of a manifold for engine exhaust gases and residues and which houses catalyst means capable of modifying at least some of the exhaust gases and residues (the most polluting ones) and trap means capable in particular of retaining certain polluting molecules and catalytically converting them into non-polluting molecules when the environment is a reducing environment (for example when the richness of the air-fuel mixture is ideal or optimal).

BACKGROUND OF THE INVENTION

The polluting exhaust gases and residues are in particular nitrogen monoxide and hydrocarbons that have not been burned in the combustion chamber of the engine.

In prior art catalytic converters the catalyst means require high operating temperatures to operate with good efficiency. The temperature of the exhaust gases and residues is totally appropriate to this. However, the trap means, which are immediately downstream of the catalyst means, are not good at withstanding the high temperatures of the gases and residues, especially when "heavily loaded", for example on a freeway. As a result the efficiency of the trap means is less than optimal if the temperature rises too high and tends to fall rapidly because the materials from which they are made deteriorate.

Also, the trap means have optimal efficiency over a relatively narrow range of temperatures that rarely includes the temperature of the exhaust gases and residues.

DISCUSSION OF THE INVENTION

An aim of the invention is therefore to provide a catalytic converter that is free of some or all of the drawbacks referred to above.

To this end the invention proposes a catalytic converter of the type described in the introduction in which a central part of the casing downstream of the catalyst means and upstream of the trap means houses cooling means adapted to reduce the temperature of the gases and residues upstream of the trap means below a predetermined threshold.

In this way there is no longer any risk of the temperature of the gases and residues reaching the trap means damaging the materials from which they are made.

The cooling means are preferably in the form of a heat exchanger and even more preferably in the form of a circulating fluid type cooling radiator.

A radiator of the above kind could be part of a circuit for controlling only the temperature of the gases and residues. However, it is particularly advantageous for the radiator to be connected to a circuit supplying fluid to a heating radiator of a heating and/or air conditioning installation of the vehicle. This enables recovery of heat via the fluid at the radiator of the catalytic converter, in particular for improved heating of the passenger compartment, for example in the period immediately after starting the engine.

In accordance with another feature of the invention the casing houses means downstream of the catalyst means for controlling access to at least a part of the central area housing the heat exchanger under the control of a control module and based on a test applying either to the temperature of the exhaust gases and residues upstream of the central area or to the time period between the start of the test and a predetermined time, for example starting of the engine.

In this way the temperature of the exhaust gases and residues reaching the trap means can be precisely controlled in accordance with the operating conditions of the engine so that the temperature can be maintained in a range of values substantially identical to the range for optimal functioning of the trap means.

Access control means of the above kind can be implemented in the form of shut-off means capable of shutting off at least part of the heat exchanger. A valve such as a butterfly valve could be used, for example.

The shut-off means can be adapted to shut off all of the heat exchanger.

In a preferred embodiment the heat exchanger has a cross-section with a smaller area than the inside cross-section of the casing so that a passage having a cross-section equal to the difference between the cross-sections of the exchanger and the casing allows direct communication between areas on respective opposite sides of the central area in the casing.

Accordingly, some of the modified gases and residues can if necessary reach the trap means directly without being cooled.

In this embodiment the shut-off means are preferably adapted to control access only to the aforementioned passage under the control of the control means and the passage is preferably formed in the heat exchanger, for example in its central area.

In accordance with another feature of the invention the casing has an empty area between the catalyst means and the cooling means for distributing the modified gases and residues. Another area of the same type can be provided between the trap means and the cooling means. This enables good distribution of the modified and/or cooled gases and residues for a more uniform temperature.

The invention applies in particular to catalyst means and trap means including agents for oxidizing the exhaust gases and residues if their respective compositions are not equal to chosen values, for example if the richness of the air/fuel mixture is not optimal, and at least to trap means that include agents for reducing the oxidized gases and residues and then converting them into non-polluting emissions if their respective compositions are substantially equal to said chosen values, for example if the richness of the air/fuel mixture is optimal.

The following description given by way of example refers to the accompanying drawings.

DESCRIPTION OF A PREFERRED EMBODIMENT OF THE INVENTION

Figure 1:
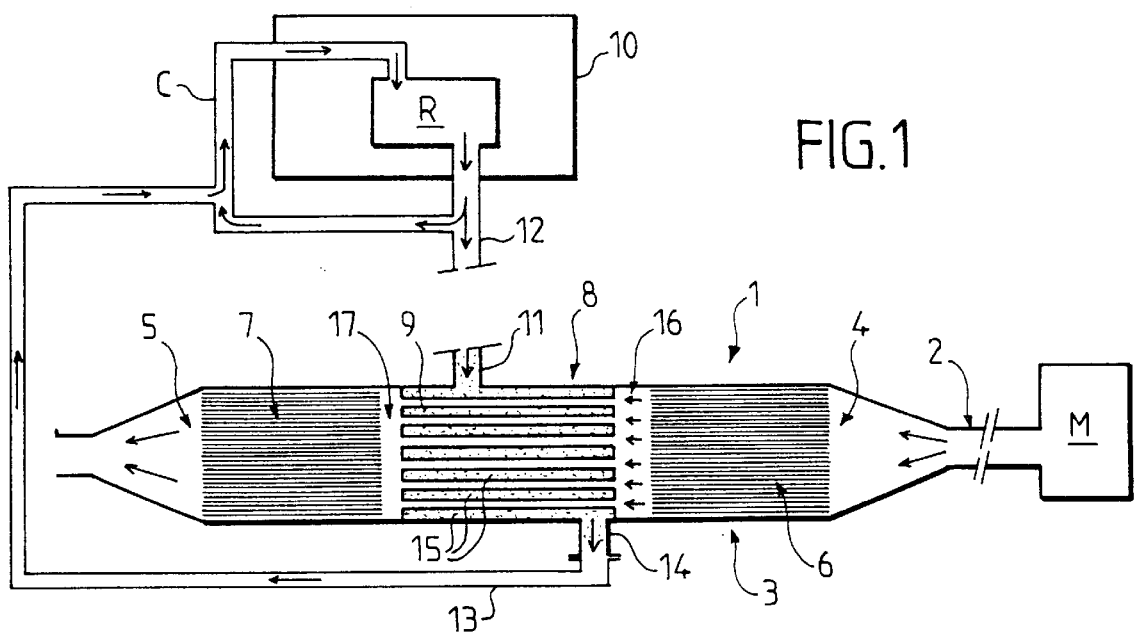
FIG. 1 is a diagrammatic view in longitudinal section of part of a first embodiment of a catalytic converter in accordance with the invention.

A first embodiment of a catalytic converter 1 in accordance with the invention is described first with reference to FIG. 1. It is assumed hereinafter that the catalytic converter 1 has an entry end 2 connected to a diesel or petrol engine M of a motor vehicle.

The purpose of the catalytic converter 1 is to reduce polluting emissions (particular types of gases and residues) from the motor M. It has an area referred to hereinafter as the casing 3 with a cross-section larger than the cross-section of its other areas, in particular its ends.

An upstream part 4 of the casing houses catalyst means and a downstream part 5 houses trap means. Here "upstream" and "downstream" refer to the direction of flow of the exhaust gases and residues from the engine to the exterior of the vehicle.

In the example shown the catalyst means include agents adapted to oxidize at least some of the exhaust gases and residues from the motor M and in particular hydrocarbon residues, carbon monoxide and soluble particle residues. This oxidation is effected if the richness of the air/fuel mixture is not optimal.

Such agents, for example platinum, are active if the temperature of the exhaust gases and residues they are to treat (or modify) is high.

In this example the purpose of the trap means is to capture nitrogen oxides $NO_x$ ($x\epsilon[1;n]$, where $n \geq 2$), for example nitrogen monoxide NO or nitrogen dioxide $NO_2$, if the richness of the air/fuel mixture is not optimal and to reduce the trapped oxides and then convert them into non-polluting emissions if the richness of the air/fuel mixture is optimal. The trap means can also include oxidizing agents, of course.

This mechanism of oxidation and reduction is well known to the skilled person.

However, as mentioned in the introduction, this mechanism has the drawback of using oxidizing agents that require high temperatures, typically above 300° C., for good oxidation efficiency, while the agents for trapping the oxidized gases and residues, such as zeolite, cannot withstand such high temperatures and offer good operating efficiency only in a relatively narrow range of temperatures, typically approximately 200° C. to approximately 400° C.

To be able to reduce the temperatures of the gases and residues oxidized (or modified) by the oxidizing agents of the catalyst means 6, the catalytic converter in accordance with the invention includes a heat exchanger 9 in a central part 8 between the upstream part 4 and the downstream part 5, in other words downstream of the catalyst means 6 and upstream of the trap means 7.

The heat exchange is preferably in the form of a cooling radiator in which a heat-conducting fluid flows.

A fluid circulation type cooling radiator 9 can be part of an autonomous closed circuit. However, as shown in FIG. 1, it is preferable for the cooling radiator 9 to be fed by the circuit C supplying fluid to the heating radiator R of the heating and/or air conditioning installation 10 of the vehicle in which the engine M is installed. To this end it is sufficient for the circuit C that feeds the heating radiator R to be provided with a branch connection 12 that can be connected to the entry tube 11 of the cooling radiator 9 accommodated in the casing 3 of the catalytic converter 1 and a manifold 13 that can be connected at one end to the exit pipe 14 from the radiator 9 and at another end to the circuit C.

In this way the fluid flowing in the heating radiator R of the installation 10 exchanges heat with the air that it is to heat. It is therefore at a lower temperature on leaving the radiator R than on entering the radiator. A portion of the cooled fluid remains in the main circuit C and another portion takes the branch connection 12 to feed the entry pipe 11 of the cooling radiator 9. There the "diverted" fluid is heated by the exhaust gases and residues that have just been (at least partly) oxidized by the catalyst means 6. The diverted fluid heated in this way leaves the radiator 9 via its exit pipe 14 and then, via the auxiliary circuit 13, rejoins the main circuit C in which it is mixed in to contribute to increasing the average temperature of the remainder of the fluid. As a result the fluid entering the heating radiator R can exchange more heat with the flow of air that the installation 10 is to treat. This increases the efficiency of the heating radiator R so that the environment in the passenger compartment of the vehicle can be brought under control faster.

Although this is not shown in FIG. 1, the cooling of the gases and residues inside the casing 3 of the catalytic converter 1 can be controlled by a control module so that the fluid flowing in the main circuit C feeds the cooling radiator 9 only if the temperature of the exhaust gases and residues exceeds a particular predetermined threshold. A control module of this kind could be connected to a temperature sensor in the upstream part of the casing, for example.

The cooling radiator 9 housed in the casing of the catalytic converter 1 can take various forms, depending on requirements and the intended applications. Accordingly, in the example shown, the radiator 9 has a cross-section substantially equal to the inside cross-section of the casing 3. It occupies substantially all of the central area 8 and is in the form of a bundle of tubes 15 spaced from each other to enable the exhaust gases and residues from the oxidation means 6 to flow between them. The exhaust gases and residues exchange heat with the fluid flowing in the cooling radiator 9 as they flow over the tubes 15.

To improve the consistency of cooling of the exhaust gases and residues it is advantageous to provide an empty area 16 to distribute the gases and residues between the oxidizing means 6 and the cooling radiator 9, i.e. upstream of the central area 8.

Similarly, to improve the uniformity of the temperature of the cooled gases and residues and the distribution of the oxidized gases and residues it is advantageous to provide another empty area 17 downstream of the central area, to be more precise between the cooling radiator 9 and the trap means 7.

Clearly a single empty area could be provided rather than two.

A catalytic converter of the above kind can be connected by appropriate connection means to the circuit C feeding a heating and/or air conditioning installation at the entry and exit tubes of the cooling radiator integrated into the casing.

A second embodiment of a catalytic converter in accordance with the invention will now be described with reference to FIGS. 2 and 3.

The second embodiment is substantially identical to the first embodiment with the main exception of the cooling radiator. Consequently, all components substantially identical to those shown in FIG. 1 are identified by the same reference numbers as used for them in FIG. 1.

Here means 18 controlling access to at least part of the central area 8 housing the cooling radiator 9 are provided in addition to the cooling radiator 9.

The access control means 18 are preferably provided at the entry to the central area 8 to control the quantity of exhaust gases and residues to be cooled by the cooling radiator 9. The access control means 18 can have a cross-section substantially equal to the inside cross-section of the central area 8 of the casing 3 so as to shut off access to the central area 8 completely or a cross-section smaller than that of the casing 3 so as to control access to only part of the central area 8.

The access control means 18 can be in the form of a valve, for example a butterfly valve.

In the example shown in FIGS. 2 and 3 the access control means 18, referred to hereinafter as the butterfly valve 18, control access to a passage 19 allowing direct communication between the upstream area 4 and the downstream area 5, to be more precise between the first empty area 16 and the second empty area 17 respectively downstream of the catalyst means 6 and upstream of the trap means 7. Consequently, in the embodiment shown, the butterfly valve 18 has a cross-section at most equal to the cross-section of the passage 19 which in this example is formed in a central part of the cooling radiator 9 (see FIG. 3).

To be more precise, in the example shown, the casing of the catalytic converter 3 is substantially a circular cylinder and the cooling radiator 9 is in the form of a circular cylindrical ring 20 in which the heat-conducting fluid flows and which has passages 21 through it through which the exhaust gases and residues from the catalyst means 6 flow from the upstream area to the downstream area.

The position of the butterfly valve 18 is controlled by a control module 22. Depending on the application, the butterfly valve can adopt two or three or more positions to control with greater or lesser precision the quantity of exhaust gases and residues to be cooled by the cooling radiator 9, to be more precise on passing through the latter via the passages 21.

The control module 22 controls the position of the butterfly valve 18 during a test applying to a parameter such as the temperature of the exhaust gases and residues upstream of the central area 8, for example at the entry end 2 of the catalytic converter, or the time period between the beginning of the test and a predetermined time, for example the starting of the engine of the vehicle.

Figure 2:
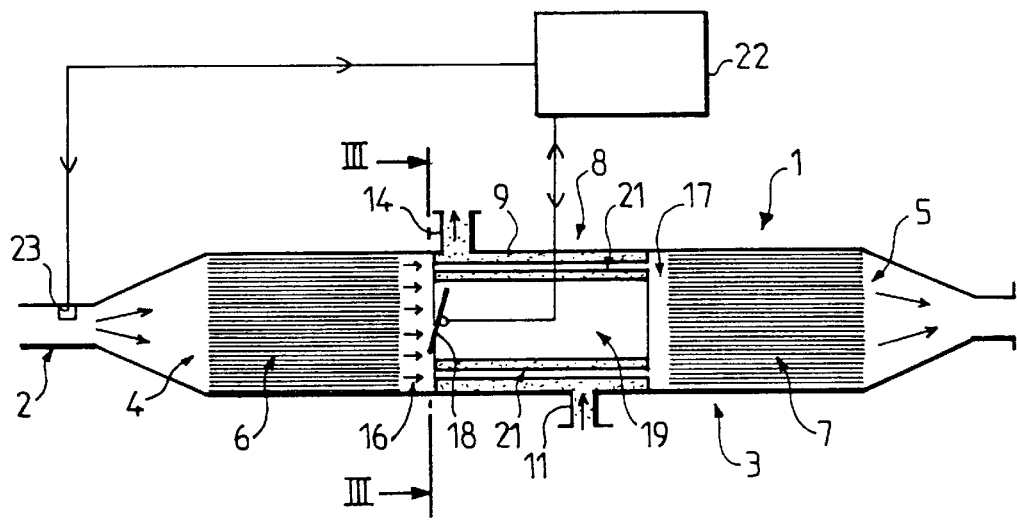
FIG. 2 is a diagrammatic view in longitudinal section of part of a second embodiment of a catalytic converter in accordance with the invention.
Figure 3:
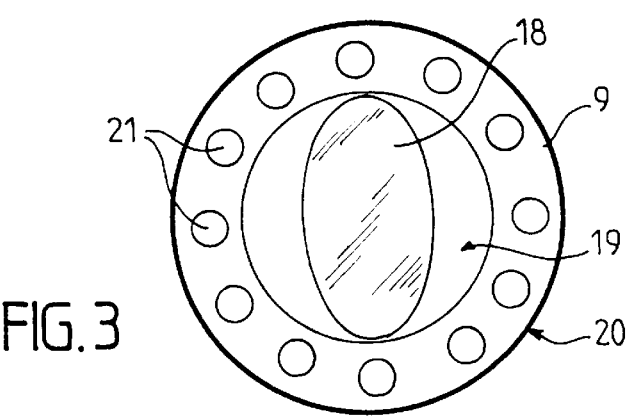
FIG. 3 shows the catalytic converter from FIG. 2 in cross-section taken along the line IIIa—IIIA.

In the example shown in FIG. 2 this parameter is the temperature of the exhaust gases and residues supplied by a temperature sensor 23 housed in the entry end 2 of the catalytic converter.

Of course, other parameters could be considered. Similarly, the predetermined time could be a particular moment in the operating cycle of the engine of the vehicle, for example.

By controlling the butterfly valve 18 the control module 22 can maintain the temperature of the exhaust gases and residues within a temperature range substantially corresponding to the optimal operating range of the trap means 7. If the temperature is below a first predetermined threshold the butterfly valve is opened so that the air is not cooled. If the temperature is above a second predetermined threshold, which can be the same as the first threshold, the butterfly valve is closed so that all of the air or at least most of it is cooled. If a third temperature threshold, higher than the first two, is exceeded, the butterfly valve can be at least partly opened so that the temperature of the fluid flowing in the cooling radiator does not exceed a value above which it would interfere with the operation of the heating and/or air conditioning installation. Naturally, many intermediate modes can be considered so that the temperature of the exhaust gases and residues can be controlled precisely.

Clearly the passage 19 can be formed elsewhere in the casing 3 than in the central area 8. Thus the cooling radiator 9 and the passage 19 could have complementary cross-sections with their sum substantially equal to the cross-section of the central part 8 of the casing 3.

In an alternative embodiment a plurality of passages 19 each controlled by a butterfly valve 18 (or access control means) could be provided.

The catalytic converter of the invention consequently has the following advantages, in combination or separately, depending on the particular embodiment concerned:

the temperature of the exhaust gases and residues is kept below a threshold to prevent destruction of the trapping agents;

the temperature of the exhaust gases and residues is kept within a predetermined temperature range corresponding to the optimal operating range of the trap means;

heating of the passenger compartment of the vehicle is improved, in particular the speed at which the environment parameters converge is increased, by heating the fluid feeding the heating radiator of the heating and/or air conditioning installation;

a back-pressure is generated at the exhaust to accelerate warming up of the engine if the access control means shut off the communicating passage.

The invention is not limited to the embodiments described hereinabove by way of example only but extends to other embodiments that will suggest themselves to the skilled person within the scope of the claims.

Many forms of heat exchanger other than those described hereinabove could be used. In particular, the heat exchanger could include its own fluid feed circuit.

The foregoing description covers a mode of control of the position of the butterfly valve by the control module during a test applying to one parameter, but several parameters could be used, the same as or other than those referred to above.

What is claimed is:

1. A catalytic converter comprising a casing having an entry end connected to an outlet of an exhaust gas and residues manifold of an engine and housing catalyst means for modifying at least some of said exhaust gases and residues and trap means for retaining at least some of the modified gases and residues, wherein said casing has a central part downstream of said catalyst means and upstream of said trap means housing a heat exchanger adapted to reduce the temperature of said gases and residues upstream of said trap means below a predetermined threshold, wherein said heat exchanger has a cross-section of smaller area than the inside cross-section of said casing so that a passage having a cross-section equal to the difference between said cross-sections of said exchanger and said casing allows direct communication between areas on respective opposite sides of said central area in said casing.

2. A catalytic converter according to claim 1 wherein said heat exchanger is a circulating fluid cooling radiator.

3. A catalytic converter according to claim 2 wherein said radiator is connected to a fluid feed circuit of a heating radiator of a heating and air conditioning installation.

4. A catalytic converter according to claim 1 wherein said access control means comprise shut-off means for shutting off at least a part of said heat exchanger and said shut-off means are adapted to control access to said passage under the control of said control means.

5. A catalytic converter according to claim 4 wherein said passage is formed in said heat exchanger.

6. A catalytic converter according to claim 5 wherein said passage is formed in a central area of said heat exchanger.

7. A catalytic converter according to claim 1 wherein said casing houses means downstream of said catalyst means for controlling access to at least a part of said central area in accordance with commands from a control module conditioned by a test applying to the temperature of said exhaust gases and residues upstream of said central area.

8. A catalytic converter according to claim 7 wherein said access control means comprise shut-off means for shutting off at least a part of said heat exchanger.

9. A catalytic converter according to claim 8 wherein said shut-off means are adapted to shut off all of said heat exchanger.

10. A catalytic converter according to claim 7, wherein said access control means comprises a butterfly valve.

11. A catalytic converter according to claim 1 wherein said catalyst means and said trap means comprise agents for oxidizing said exhaust gases and residues if their respective compositions are not equal to chosen values and at least said trap means comprise agents for reducing said oxidized gases and residues and then converting them into non-polluting emissions if their respective compositions are substantially equal to said chosen values.

12. A catalytic converter according to claim 1, wherein said casing houses means downstream of said catalyst means for controlling access to at least a part of said central area in accordance with commands from a control module conditioned by a test applying to the time period between the beginning of said test and a predetermined time.

13. A catalytic converter according to claim 12, wherein said access control means comprises a butterfly valve.

14. A motor vehicle comprising the catalytic converter of claim 1.

15. A catalytic converter according to claim 1, wherein said heat exchanger is a circulating fluid cooling radiator.

16. A catalytic converter according to claim 1, wherein said casing further houses a butterfly valve downstream of the agents for modifying at least some of said exhaust gases and residues for controlling access to at least a part of said central area, said butterfly value is controlled by a control module, said control module is connected to a temperature sensor in the upstream part of the casing.

17. A catalytic converter comprising a casing having an entry end connected to an outlet of an exhaust gas and residues manifold of an engine and housing catalyst means for modifying at least some of said exhaust gases and residues and trap means for retaining at least some of the modified gases and residues, wherein said casing has a central part downstream of said catalyst means and upstream of said trap means housing cooling means adapted to reduce the temperature of said gases and residues upstream of said trap means below a predetermined threshold, wherein said casing comprises an empty area between said catalyst means and said cooling means for distributing the modified gases and residues.

18. A catalytic converter comprising a casing having an entry end connected to an outlet of an exhaust gas and residues manifold of an engine and housing catalyst means for modifying at least some of said exhaust gases and residues and trap means for retaining at least some of the modified gases and residues, wherein said casing has a central part downstream of said catalyst means and upstream of said trap means housing cooling means adapted to reduce the temperature of said gases and residues upstream of said trap means below a predetermined threshold, wherein said casing comprises an empty area between said cooling means and said trap means for distributing the modified and cooled gases and residues.

19. A catalytic converter comprising a casing having an entry end connected to an outlet of an exhaust gas and residues manifold, and housing agents for modifying at least some of said exhaust gases and residues and oxidizing agents for capturing at least some of the modified gases and residues, wherein said casing has a central part downstream of said agents for modifying at least some of said exhaust gases and residues and upstream of said oxidizing agents for capturing at least some of the modified gases and residues housing a heat exchanger adapted to reduce the temperature of said gases and residues upstream of the oxidizing agents for capturing at least some of the modified gases and residues below a predetermined threshold, said casing further having an empty area between the agents for modifying at least some of said exhaust gases and residues and the heat exchanger for distributing the modified gases and residues and an empty area between the oxidizing agents for capturing at least some of the modified gases and residues and the heat exchanger for distributing the modified and cooled gases and residues.

* * * * *